United States Patent [19]

Mantoan et al.

[11] Patent Number: 5,542,715
[45] Date of Patent: Aug. 6, 1996

[54] METAL EXPANSION JOINT AND VIBRATION ABSORBER APPARATUS FOR PIPE SYSTEMS

[75] Inventors: Silvano Mantoan, Au; Werner Petermann, Emmenbrücke, both of Switzerland

[73] Assignee: BOA AG, Rothenburg, Switzerland

[21] Appl. No.: 442,689

[22] Filed: May 17, 1995

[51] Int. Cl.$^6$ ................................................. F16L 51/02
[52] U.S. Cl. ........................... 285/226; 285/286; 285/300
[58] Field of Search ................................. 285/286, 187, 285/300, 226, 424, 903

[56] References Cited

U.S. PATENT DOCUMENTS

| | | |
|---|---|---|
| 1,565,254 | 12/1925 | Bystrom . |
| 1,726,483 | 8/1929 | Giesler ................................ 285/300 X |
| 2,337,038 | 12/1943 | Fentress . |
| 2,616,728 | 11/1952 | Pitt ........................................ 285/300 |
| 2,712,456 | 7/1955 | McCreery ........................ 285/187 X |
| 2,840,394 | 6/1958 | Rohr . |
| 3,298,680 | 1/1967 | Jablin . |
| 3,492,030 | 1/1970 | Harrison et al. ..................... 285/300 |
| 4,106,798 | 8/1978 | Haug ................................... 285/226 |
| 5,480,194 | 1/1996 | Mantoan et al. ..................... 285/226 |

OTHER PUBLICATIONS

U.S. patent application Ser. No. 08/342,835 Mantoan et al. Nov. 21, 1994.

Primary Examiner—Terry Lee Melius
Assistant Examiner—Heather Chun Shackelford
Attorney, Agent, or Firm—Marshall, O'Toole, Gerstein, Murray & Borun

[57] ABSTRACT

The apparatus includes a first protection sleeve element having a substantially radially upturned annular end portion, a second protection sleeve element having also a substantially radially upturned end portion and a bellows. The bellows ends at both sides in a neck. A cylinder shaped portion of the first protection sleeve element is surrounded by an envelope part having a cylinder shaped portion and a substantially radially upturned annular end portion. Likewise, a cylinder shaped portion of the second portion sleeve element is surrounded by an envelope part having a cylinder shaped portion and a substantially radially upturned annular end portion. The necks of the bellows are sandwiched between the cylinder shaped portions of the respective envelope parts and the first protection sleeve element and the second protection sleeve element and are welded thereto. The upturned end portions of the respective envelope parts and the first and second protection sleeve elements contact each other and form the flanges of the apparatus.

6 Claims, 2 Drawing Sheets

METAL EXPANSION JOINT AND VIBRATION ABSORBER APPARATUS FOR PIPE SYSTEMS

BACKGROUND OF THE INVENTION

1. Field of the Invention

The present invention relates to a metal expansion joint and vibration absorber apparatus for pipe systems having at least one metal bellows element which has a first and a thereto opposite second neck; a first and a thereto opposite second flange structure, a first protection sleeve element, a second protection sleeve element which includes a pipe stub element located inside of and extending coaxially to the metal bellows element, in which a portion of said first protection sleeve element is received.

Metal expansion joints and vibration absorber apparatuses in pipe systems are predominantly used in two applications. A first application is the use of such apparatuses as expansion joint and a second application is the use as vibration absorber. In both applications the basically same design of the apparatus is used, whereby in case of expansion joints the primary operation of the apparatus is taking up displacements of pipes in a pipe system whereby such apparatus absorbs due to its design comprising a metal bellows element as secondary effect also possible vibrations in the pipe system. In case of vibration absorption the primary operation of the apparatus is absorbing vibrations in a pipe system whereby such apparatus takes up displacements of pipes in the pipe system as secondary effect. Also possible are applications in which the apparatus is used to take up displacements and simultaneously to absorb vibrations. The basic operating member of these apparatuses is its metal bellows which is calculated and designed regarding material, dimensions, etc. depending from the prevailing object, namely to absorb pipe displacements or then to absorb vibrations.

When such apparatus is used as pipe displacement absorbing apparatus it is called expansion joint.

Expansion joints are commonly used in pipe lines, pipe line systems and circuits in which for instance due to high or low temperature of the commodity flowing through the pipes the temperature of the pipes themselves increases or decreases accordingly leading to thermal expansions or contractions, resp. These expansions or contractions, resp. cause generally changes of the axial dimension of the pipes and also angular movements and lateral shifting displacements. In order to take such displacements up expansion joints are inserted between the pipe sections, whereby the metal bellows of these joints contract and expand such to take up mentioned changes of the dimensions.

The object of vibration absorbers is the absorption of vibrations in pipe systems in that the metal bellows absorbs vibrations or oscillations, resp. caused by the commodity flowing in the pipe system (turbulence), or vibrations stemming from a machine to which pipes are coupled, e.g. compressors or internal combustion machines, whereby in the latter case the exhaust pipe or manifold is coupled via such a vibration absorber to the machine.

2. Description of the Prior Art

Metal expansion joint and vibration absorbing apparatuses have commonly included a single or multiple bellows element made of a thin sheet of metal and formed with convolutions, which sheet metal bellows element is mounted e.g. by welding, soldering or clamping at both its ends to respective flange elements, via which the expansion joint or vibration absorber, resp. is coupled at both its ends e.g. via bolts or clamps to an adjacent pipe section of a pipe system or machine, resp. In order to protect the bellows from the commodity or fluid, resp. flowing through the apparatus and also to avoid turbulences in the fluid a protection sleeve can be arranged inside the bellows which extends coaxially thereto. This protection sleeve is generally mounted in one or the other way to one of the flanges. It may have an upturned end sandwiched between the flange of the expansion joint or vibration absorber, resp. and the flange of an adjoining structure, e.g. pipe, or it could be welded to the flange of the expansion joint.

Thus, the known expansion joints or vibration absorbers, resp. are assembled of a plurality of parts of various structural and physical properties. Accordingly, a manufacturer must keep a rather large amount of different articles for assembling such apparatuses in stock, the assembling of the apparatuses is time-consuming because a plurality of individual articles must be assembled and finally, specifically due to the solid flanges, the known expansion joints and vibration absorbers, resp. have a relatively considerable weight.

SUMMARY OF THE INVENTION

Therefore, it is a general object of the present invention to provide a metal expansion joint and vibration absorber apparatus for pipe systems in which a maximum of the parts may be of an identical sheet material, which is of an extremely light weight and can be produced more efficiently and, therefore at low costs, or alternatively can be assembled of several individual parts of differing thickness and physical properties to cope with prevailing conditions of operation.

A further object is to provide a metal expansion joint and vibration absorber apparatus which includes a first envelope part having a cylinder shaped portion and a thereto continuous and substantially upturned annular end portion; of which the first protection sleeve element includes a further cylinder shaped portion and a further thereto continuous and substantially radially upturned annular end portion; which upturned annular end portion of the first envelope part abuts the upturned annular end portion of the first protection sleeve element, whereby these two end portions form the first flange structure.

Yet a further object is to provide a metal expansion joint and vibration absorber apparatus which includes further a second envelope part having a cylinder shaped portion and a thereto continuous and substantially radially upturned annular end portion; of which the second protection sleeve element with the pipe stub element includes a further cylinder shaped portion and a further thereto continuous and substantially radially upturned end portion; which upturned annular end portion of the second envelope part abuts the upturned annular end portion of the second protection sleeve element whereby these two end portions form the second flange structure; and which second neck of the bellows is sandwiched between and mounted to the cylinder shaped portions of the second envelope part and the second protection sleeve element, resp.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
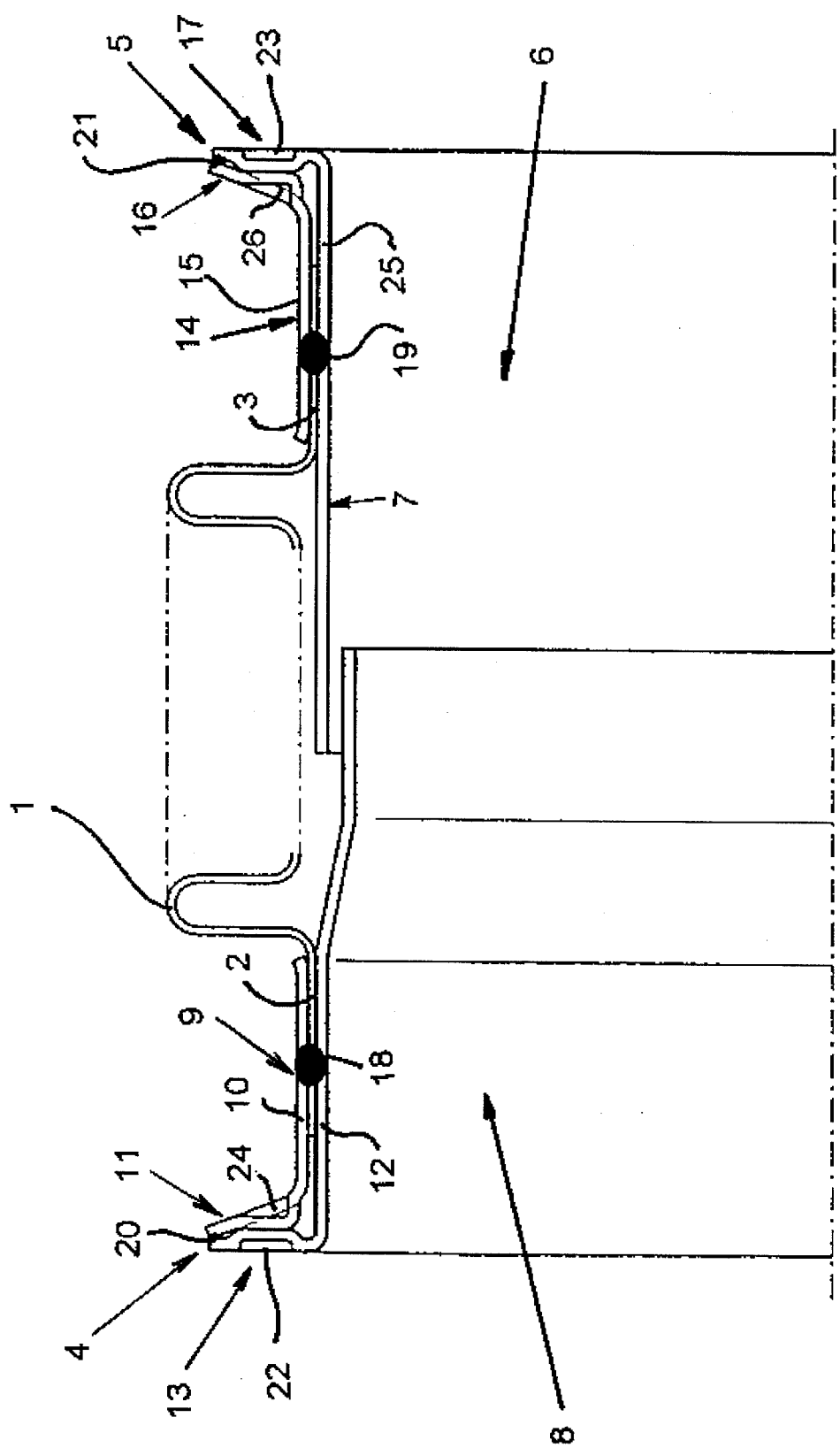
FIG. 1 is a schematic view of a longitudinal section through the upper half of a preferred embodiment of the invention.

The apparatus shown includes a metal bellows element 1 made of a thin flexible sheet metal which has been formed to have the illustrated convolutions. The metal selected can be any kind of metal having the pre-requisite flexibility when deformed and possibly selected to withstand the pressure, temperature and also possible chemical attacks of the fluid it comes in contact with.

The bellows element 1 illustrated in the drawings is of a single-ply design. Obviously, this bellows element 1 could be of a multi-ply design as also commonly known in the prevailing art. The bellows element 1 ends at its left end in a first neck 2 and at its right end in a second neck 3 according to commonly known designs of bellows.

A first protection sleeve element 8 includes also a cylinder shaped portion 12 which is followed by a further substantially radially upturned annular end portion 13.

A second protection sleeve element 6 is located based on FIG. 1 at the right side of the apparatus, which sleeve element 6 includes a pipe stub element 7 extending inside the bellows 1 and coaxially thereto. This pipe stub element 7 is followed by a cylinder shaped portion 25 of the sleeve element 6, which cylinder shaped portion 25 ends at a substantially radially upturned annular end portion 17, i.e. this upturned end portion 17 has roughly the shape of circular ring positioned perpendicularly to the longitudinal axis of the apparatus.

The first protection sleeve element 8 projects at one end coaxially into the pipe stub element 7.

An annular envelope part 9 includes a cylinder shaped portion 10 which surrounds the cylinder shaped portion 12 of the first protection sleeve element 8. The cylinder shaped portion 10 ends also at a substantially radially upturned annular end portion 11 which will be described in detail further below.

A further annular envelope part 14 includes a further cylinder shaped portion 15. This cylinder shaped portion 15 surrounds the cylinder shaped portion 25 of the second protection sleeve element 6 and ends at a substantially radially upturned annular end portion 17.

As can be seen, the neck 2 of the bellows 1 is sandwiched between the cylinder shaped portion 10 of the envelope part 9 and the cylinder shaped portion 12 of the first protection sleeve element 8. In this embodiment these three parts are interconnected by a welding 18. Obviously, various kinds of weldings, e.g. spot welding, elongate welding seams, or other kinds of techniques such as riveting can be chosen for accomplishing this connection.

Likewise, the neck 3 at the opposite end of the bellows 1 is sandwiched between the cylinder shaped portion 15 of the envelope part 14 and the cylinder shaped portion 25 of the second protection sleeve element 6. Again, the interconnection of this embodiment is made by a welding 19.

Figure 2:
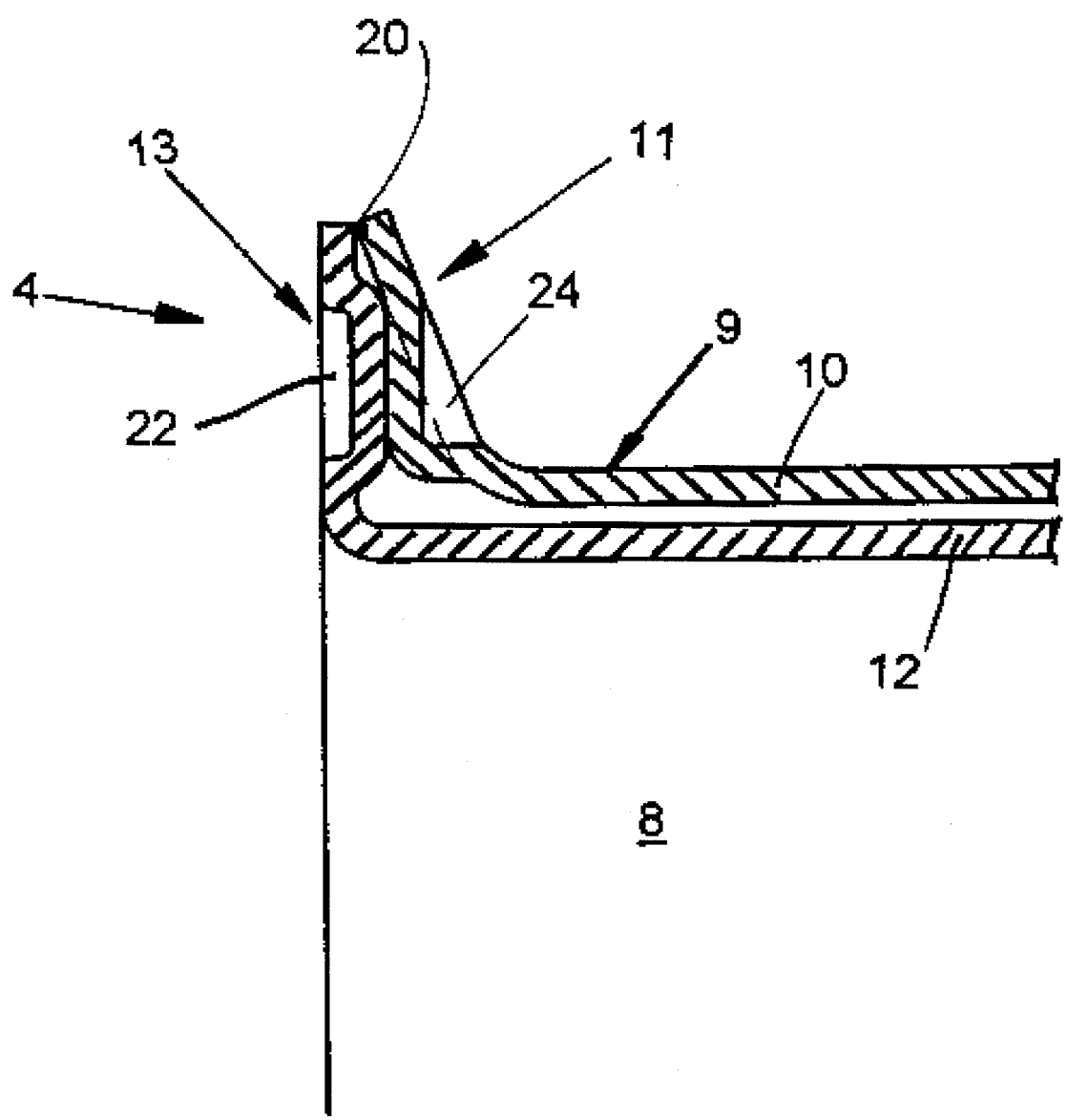
FIG. 2 is a schematic sectional view on a somewhat enlarged scale of the left hand flange area of the embodiment shown in FIG. 1.

Attention is now drawn to the left side of FIG. 1 and to FIG. 2. The upturned annular end portion 11 of the first envelope part 9 contacts the upturned annular end portion 13 of the first protection sleeve element 8. These end portions 11 and 13 form now together a flange structure 4 of the apparatus, i.e. one of its two flanges. The portions 11 and 13 can, but must not necessarily, be interconnected by a welding 20. In use, the apparatus will be coupled via this flange, i.e. flange structure 4, to a (not illustrated) adjoining pipe or other part of a plant, such as a pump. This coupling can be achieved by a variety of techniques. Here it shall be assumed that the coupling is made (according to a well-known technique) by a ring of a U-shaped cross section which is clamped over the flange structure 4 and the flange of an adjoining e.g. pipe, such that the flange structure 4 and the adjacent flange are inserted between the two legs of the U-shape. At its surface facing away from the bellows 1 the upturned annular end portion 13 which may be planar or may be deformed such to include as shown in this embodiment an annular recess 22. A sealing ring (not illustrated) can be placed into this recess 22.

The upturned annular end portion 11 of the left envelope part 9 extends at an acute angle relative to the upturned end portion 13 of the first protection sleeve element 8. This end portion has thus generally the shape of a truncated cone. It includes several recessed areas 24. Therefore, at its side facing away from the bellows 1 it is at the recessed areas 24 in surface contact with the upturned end portion 13 of the first protection sleeve element 8. These recessed areas 24 serve as abutment and as reinforcement of the upturned end portion 11. It should be noted that the two upturned portions 11 and 13 contact each other additionally along their circumference where they may possibly be welded together such as shown by the welding 20.

At its right side (according to FIG. 1) the apparatus, i.e. its components are of the same design as exemplified above regarding the left side. Thus, the upturned annular end portion 16 of the second envelope part 14 contacts the upturned annular end portion 17 of the second protection sleeve element 6. These end portions 16 and 17 form together the flange structure 5 of the apparatus and can, but must not necessarily, be interconnected by a welding 21. The recess in the upturned annular end portion 17 is identified by the reference numeral 23. The upturned annular end portion 16 of the second envelope part 14 extends at an acute angle relative to the upturned end portion 17 of the second protection sleeve element 6 and has again the shape of a truncated cone and includes recessed areas 26 forming abutments and reinforcements and being in a surface contact with the upturned end portion 17 of the second protection sleeve element 6. In this embodiment, these two end portions 16 and 17 are interconnected by a welding 21.

Thus, it can be seen from the above detailed description of the preferred embodiment that the metal expansion joint and vibration absorber apparatus consists of thin walled interchangeable parts which are interconnected by weldings. Specifically to be noted is that the first protection sleeve element 8 and the second protection sleeve element 6 can be made of materials which differ from the materials of which the two envelope parts 9 and 14 which increases the versatility regarding a selection of materials. Therefore, the described apparatus is not only of an extreme light weight design but can be produced at low cost.

While there is shown and described a present preferred embodiment of the invention, it is to be distinctly understood that the invention is not limited thereto, but may be otherwise variously embodied and practiced within the scope of the following claims.

We claim:

1. A metal expansion joint and vibration absorber apparatus, including at least one metal bellows element with a first neck extending axially from one end and a second neck extending from the other end of said bellows element;

a first and a second flange structure;

said first protection sleeve element comprising a cylindrically shaped portion and a further continuous and substantially radially upturned annular end portion;

a second protection sleeve element which includes a pipe stub element located inside of and extending coaxially to said metal bellows element, in which a portion of said first protection sleeve element is received, said expansion joint and vibration absorber apparatus comprising a first envelope part having a cylindrically shaped portion and a thereto continuous and substantially radially upturned annular end portion; and said upturned annular end portion of said first envelope part abuts the upturned annular end portion of said first protection sleeve element, whereby said two end portions form said first flange structure;

and said neck of said metal-bellows is sandwiched between and mounted to the cylindrically shaped portions of the first envelope part and the first protection sleeve element.

2. The metal expansion joint and vibration absorber apparatus of claim 1, said apparatus comprising a second envelope part having a cylindrically shaped portion and a thereto continuous and substantially radially upturned annular end portion; and said second protection sleeve element further comprising a cylindrically shaped portion and a further continuous and substantially radially upturned annular end portion;

said upturned annular end portion of the second envelope part abuts the upturned annular end portion of the second protection sleeve element, whereby these two end portions form said second flange structure;

and said second neck of said bellows is sandwiched between and mounted to the cylindrically shaped portions of the second envelope part and the second protection sleeve element.

3. The expansion joint and vibration absorber apparatus of claim 2, in which the first and second necks of said bellows are welded to the respective cylindrically shaped portions.

4. The expansion joint and vibration absorber apparatus of claim 2, in which the substantially radially upturned annular end portion of said first envelope part is welded to the second substantially radially upturned annular end portion of said first protection sleeve element, and the substantially radially upturned annular end portion of said second envelope part is welded to the substantially radially upturned annular end portion of said second protection sleeve element.

5. The expansion joint and vibration absorber apparatus of claim 2, in which the substantially radially upturned annular end portions of both said first and second protection sleeve elements comprise an annular recess at radially extending surfaces which face away from the bellows element.

6. The expansion joint and vibration absorber apparatus of claim 2, in which the substantially radially upturned end portions of said first envelope part and said second envelope part extend at an acute angle relative to the respective substantially radially upturned end portions of the first protection sleeve element and the second protection sleeve element, and include a plurality of recessed areas, and wherein the surfaces facing away from the bellows are in surface contact with the surfaces of the substantially radially upturned end portions the first and second protective sleeve elements facing the bellows.

* * * * *